US012622434B2

(12) United States Patent
Samaniego

(10) Patent No.: US 12,622,434 B2
(45) Date of Patent: May 12, 2026

(54) PROTECTIVE COMPOSITION AGAINST DAMAGE TO PLANTS, REPAIRER AND STIMULATING THEIR TISSUES GROWTH

(71) Applicant: Centro de Tecnologia y Desarrollo Mezfer S.C., Celaya (MX)

(72) Inventor: Beatriz Flores Samaniego, Celaya (MX)

(73) Assignee: CENTRO DE TECNOLOGIA Y DESARROLLO MEZFER S.C. (MX)

( * ) Notice: Subject to any disclaimer, the term of this patent is extended or adjusted under 35 U.S.C. 154(b) by 335 days.

(21) Appl. No.: 17/821,859

(22) Filed: Aug. 24, 2022

(65) Prior Publication Data

US 2024/0065274 A1    Feb. 29, 2024

(51) Int. Cl.
*A01N 61/02*        (2006.01)
*A01N 43/16*        (2006.01)

(52) U.S. Cl.
CPC ............. *A01N 61/02* (2013.01); *A01N 43/16* (2013.01)

(58) Field of Classification Search
CPC ........ A01N 61/00; A01N 65/42; A01N 43/16; A01P 21/00
See application file for complete search history.

(56) References Cited

U.S. PATENT DOCUMENTS

| | | | |
|---|---|---|---|
| 4,500,510 A | 2/1985 | Goldstein | |
| 2017/0258096 A1* | 9/2017 | Coats ..................... | A01N 25/04 |

FOREIGN PATENT DOCUMENTS

| | | | | |
|---|---|---|---|---|
| BR | 102019017558 A2 * | 3/2021 | ............. | A01N 65/42 |
| MX | 2011013349 | 6/2013 | | |
| MX | 2012000946 | 7/2013 | | |
| MX | 2013001546 | 8/2014 | | |
| MX | 2015010277 | 2/2017 | | |
| MX | 2017005207 | 11/2018 | | |
| WO | 2008061235 | 5/2008 | | |
| WO | 2009078691 | 6/2009 | | |

OTHER PUBLICATIONS

Samaniego et al. Aloe Vera-based Plant Tissue Protector And Regenerator. BR102019017558A2—machine translation and table (Year: 2021).*
Lopez et. al. Antioxidant and Cytotoxicological Effects of Aloe vera Food Supplements. Journal of Food Quality vol. 2017, Article ID 7636237, 1-10. (Year: 2017).*
Shanker et. al. Impact of Purslane (*Portulaca oleracea* L.) Leaves Extract to Enhance the Anti-oxidant Potential of Edible Oils during Heating. J. Oleo Sci. 68, (4) 321-328 (2019) (Year: 2019).*
Muthukumaran et. al. Total phenolic and flavonoid content of membrane processed Aloe vera extract: a comparative study. IFRJ 25 (4): 1450-1456, 2018 (Year: 2018).*
Vieira et. al. Chromatic analysis for predicting anthocyanin content in fruits and vegetables. Food Sci. Technol, Campinas, 39(2): 415-422, Apr.-Jun. 2019. (Year: 2019).*
Culea et. al. Determination of Amino Acids in Corn Seed By Gas Chromatography-Mass Spectrometry. Analytical Letters, 48: 1-10, 2015. (Year: 2015).*
Lao, et. al. "Extraction of purple corn (*Zea mays* L.) cob pigments and phenolic compounds using food-friendly solvents" Journal of Cereal Science 80 (2018) 87-93. (Year: 2018).*
BR 102019017558 A2—machine translation. "Aloe Vera-based Plant Tissue Protector And Regenerator" 2021. (Year: 2021).*
Vieira "Chromatic analysis for predicting anthocyanin content in fruits and vegetables" Food Sci. Technol, Campinas, 39(2): 415-422, Apr.-Jun. 2019 (Year: 2019).*
Lopez "Antioxidant and Cytotoxicological Effects of Aloe vera Food Supplements" Journal of Food Quality, 2017. (Year: 2017).*
Lao "Extraction of purple corn (*Zea mays* L.) cob pigments and phenolic compounds using food-friendly solvents" Journal of Cereal Science, 2018. (Year: 2018).*

* cited by examiner

*Primary Examiner* — Sean M Basquill
*Assistant Examiner* — Rajan Pragani
(74) *Attorney, Agent, or Firm* — Emerson, Thomson & Bennett, LLC; Roger D. Emerson; Peter R. Detorre

(57)        ABSTRACT

A protective composition against damage to plants caused by biotic and abiotic stress agents, and repairing and stimulating the growth of their tissues, composed of plant extracts enriched in phenols, flavonoids, and anthocyanins, and which also works as a plant growth stimulant, without cause morphological alterations in the plant tissues in which it is applied.

14 Claims, 9 Drawing Sheets
(6 of 9 Drawing Sheet(s) Filed in Color)

PROTECTIVE COMPOSITION AGAINST DAMAGE TO PLANTS, REPAIRER AND STIMULATING THEIR TISSUES GROWTH

The present invention relates to a protective composition against damage to plants, which repairs and stimulates their tissues growth, and more particularly relates to a composition based on plant extracts enriched in phenols, flavonoids, and anthocyanins, which protects plants against damage caused by biotic and abiotic stress agents, and that also provides a growth-stimulating and repairing effect on plant tissues, increasing the productivity of the crops to which it is applied.

BACKGROUND OF THE INVENTION

Monocultures are controlled environments that require constant intervention by farmers in order to maintain the good health of the cultivated plants, since being organisms with so little genetic variability, they are susceptible to easily being damaged by biotic and abiotic stress agents. In addition, most biotic and abiotic stress agents cause irreversible damage to the aerial structures of crops, which greatly restricts effective treatment options; so the affected plants must be discarded as viable production units, even when they survive.

In most cases, plants damaged by biotic or abiotic stress agents rarely can be used as producer organisms, so farmers prefer to discard them avoiding inversion of resources to their maintenance. However, late in the crop cycle, the loss of these damaged plants can greatly decrease production yields, since new healthy organisms cannot replace them.

Most of the available treatments on market, are only focused on the control of biotic stress agents such as phytopathogenic and are intended solely to reduce the number of infectious agents so that they cannot continue with the infection process in new organisms. However, these treatments are not designed to prevent or repair the damage caused to the affected plant tissue, so the plant that has already been subjected to infection hardly has sufficient energy reserves to be able to recover from damage caused by biotic stress agents.

Notwithstanding, there are currently some formulations to control damage caused by abiotic stress agents on plant tissues, which use compounds of plant origin as active ingredients. Among the available options are compositions with *Aloe vera* extracts, which are used as protective agents against physical damage. For example, the development described in Patent Application MX/a/2015/010277 uses an *Aloe vera* extract in a composition proportion of between 70 and 92%, together with other compounds such as disaccharides and free amino acids. The mentioned composition proved to increase the growth rate of plants in which it was applied; however, the increase in growth rate is hardly significant, since the percentage of survival of plants is very low, being less than 50%. Therefore, the use of the composition described in this document would not guarantee the total recovery of a crop subjected to stress caused by biotic or abiotic agents.

Patent application MX/a/2017/005207 describes an antifungal composition of *Larrea tridentata* with *Aloe vera*. This composition proved to be effective in controlling various phytopathogenic fungi, and it was shown that tomato plants to which the composition was applied presented a better appearance. However, the composition described has not been shown to repair damage caused by biotic or abiotic stress agents, nor to promote plant growth, so it is necessary to use other types of products to provide nutrients to the crops that guarantee their correct development.

None of the aforementioned developments allows the regeneration of damaged plant tissue caused by biotic or abiotic stress agents, to a sufficient degree to allow the long-term survival of the affected plants. In addition, even after biotic or abiotic stress agents have been controlled, there is a considerable decrease in crop yield. Therefore, none of the available products is capable of protecting against damage and at the same time promoting plant growth to promote regeneration of damaged tissues, so that plants, if they survive the infection, present extensive regions of altered tissues that limit its correct development, which in many cases leads to the impossibility of producing the cultivable structures of the plant.

In view of the above problems, there is a need to provide a protective and regenerative composition for plant tissues damaged by biotic or abiotic stress agents, which can be used on commercial crops in order to repair serious damage to aerial parts caused by said agents of biotic and abiotic stress. Likewise, there is a need to provide a protective composition, which also serves as a plant growth stimulant and promoter of regeneration of damaged plant tissues, so that the affected plants can recover from serious damage, without there a significant decrease in crop production.

SUMMARY OF THE INVENTION

To overcome the limitations of available protective and plant growth-stimulating compositions, the present invention aims to provide a protective composition against plant damage, and repair and stimulate their tissue growth, which has the ability to improve the yield of crops in which it is applied as well as to guarantee the life of the plant.

An additional objective of the present invention is to provide a protective composition against damage to plants, and repair and stimulate their tissue growth, which promotes the active regeneration of tissues damaged by biotic stress agents such as phytopathogenic agents, and other abiotic stresses such as drought, cold, salinity or change in soil pH.

Another objective of the present invention is to provide a protective composition against damage to plants, and repair and stimulate their tissue growth, which stimulates flowering, increases fruit filling, promotes the development of leaves, and increases the stem thickness of plants in crops where it is applied.

The aforementioned as well as other objects and advantages of the present invention will become apparent from the following detailed description thereof.

BRIEF DESCRIPTION OF FIGURES OF THE INVENTION

The patent or application file contains at least one drawing executed in color. Copies of this patent or patent application publication with color drawing(s) will be provided by the Office upon request and payment of the necessary fee.

Figure 3:
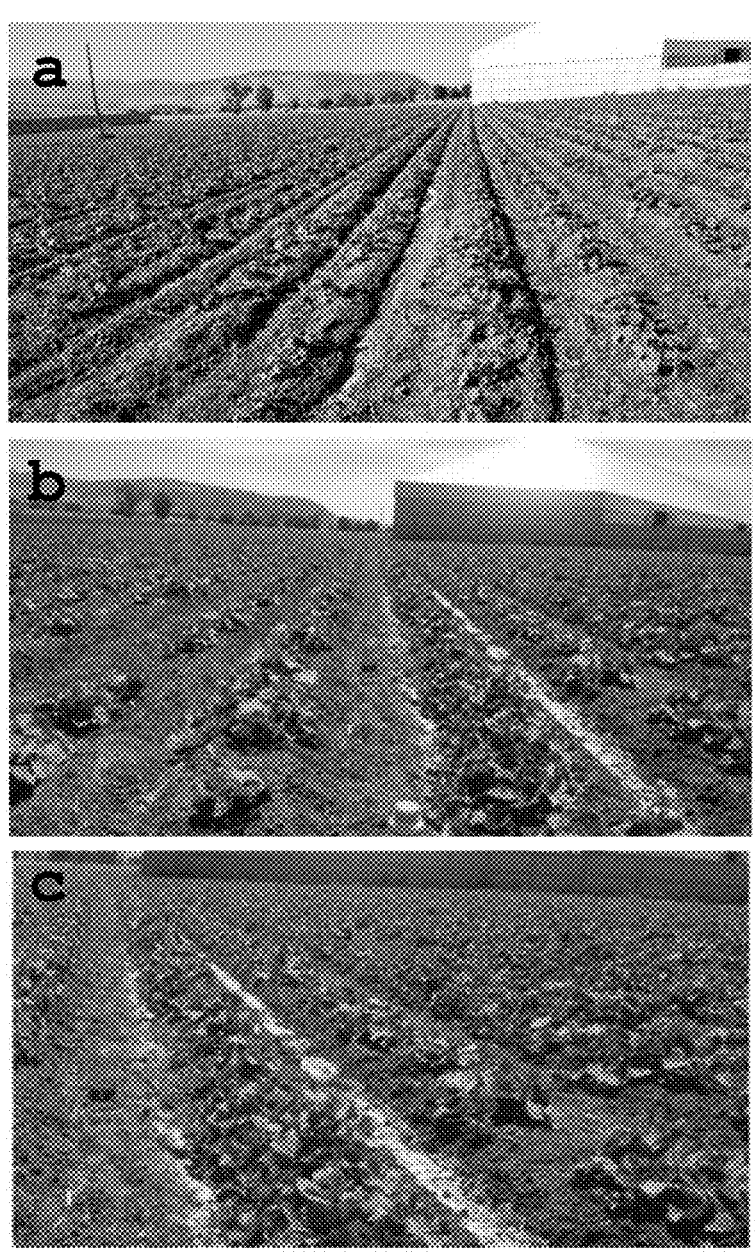

FIG. 3 shows photographs of cucumber crops in which the composition was used to accelerate vegetative development: (a) start of the test on Apr. 6, 2020, non-uniform growth and very little foliar growth are observed in the control and treatment; (b) Apr. 13, 2020, better growth is observed in the treatment with a greater number of leaves; and (c) Apr. 16, 2020, more uniform growth and a greater number of leaves are observed in the treatment, compared to the control.

Figure 4:
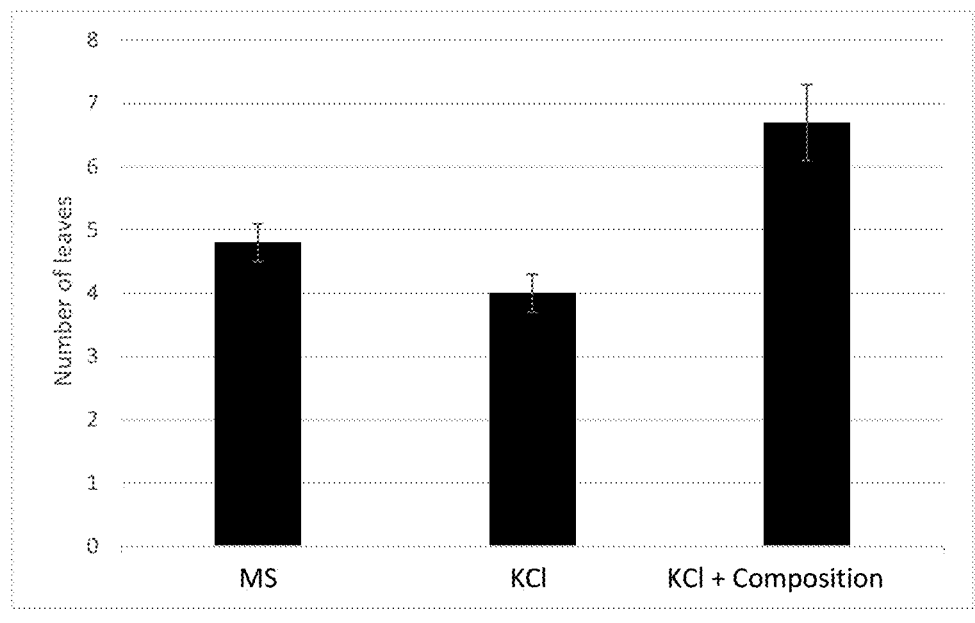
Figure 4:
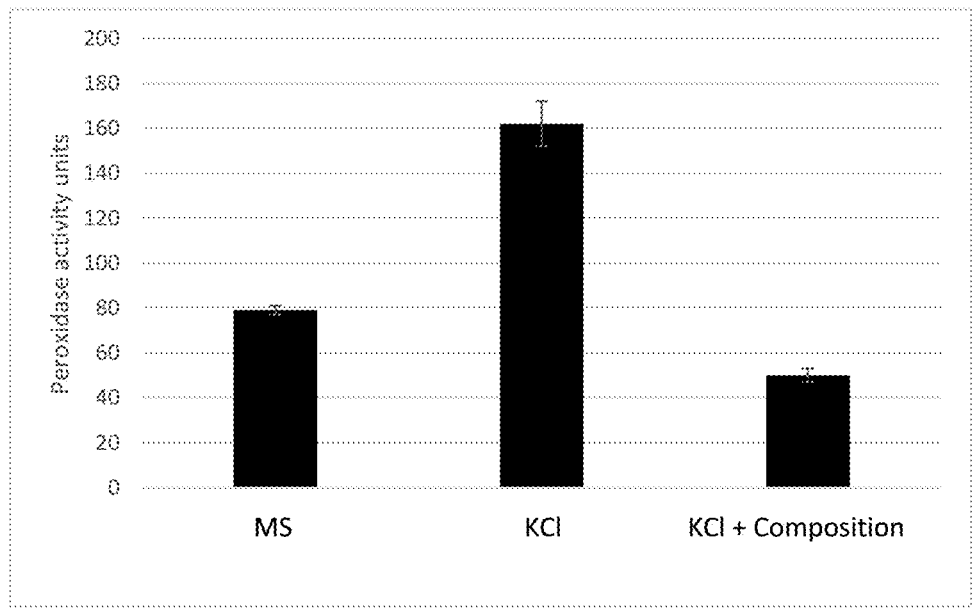

FIG. 4 shows graphs of the results regarding the number of leaves obtained by applying the composition of the present invention under salinity conditions.

Figure 5:
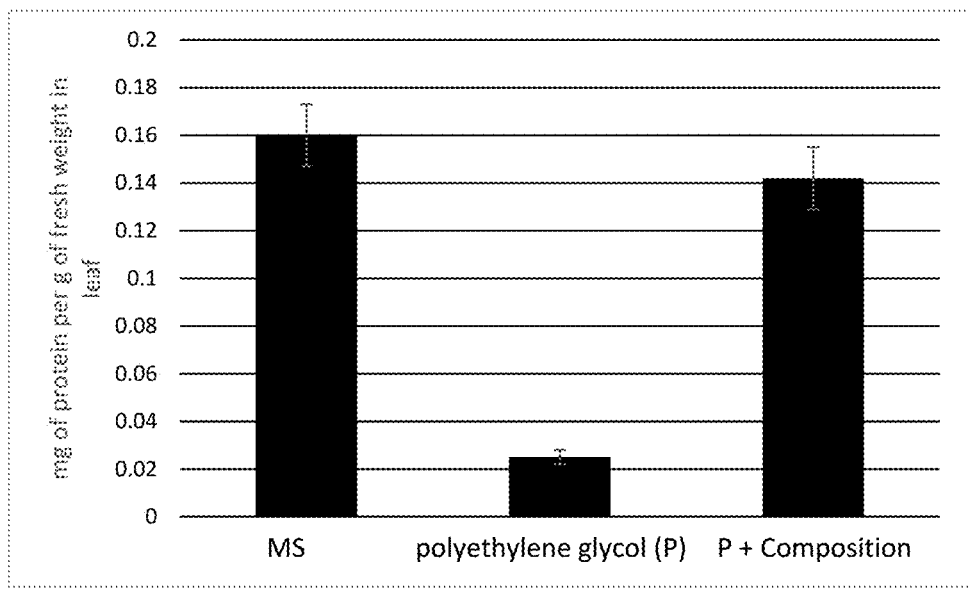
Figure 5:
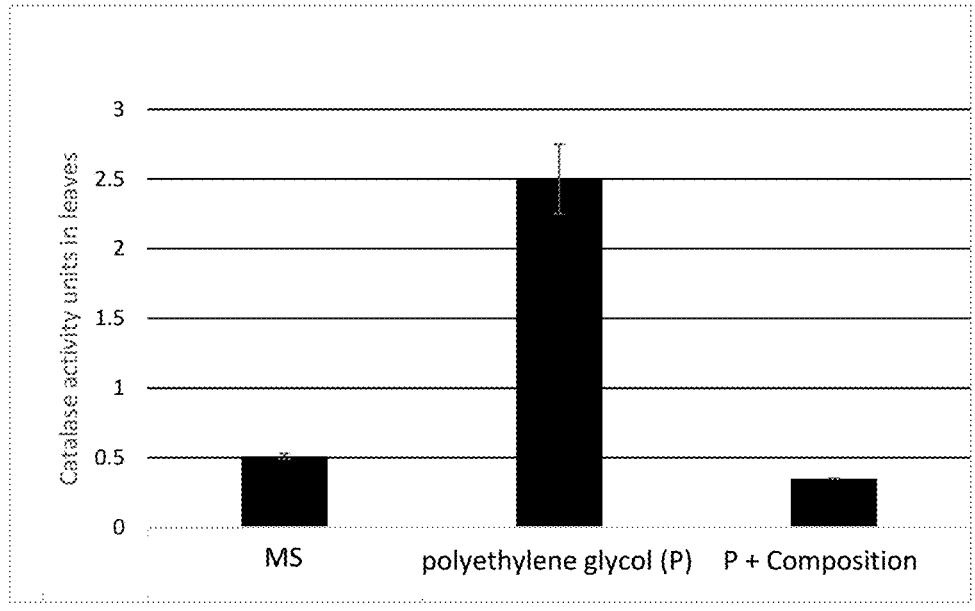

FIG. 5 shows graphs of the results regarding the number of leaves obtained by applying the composition of the present invention under drought conditions.

Figure 6:
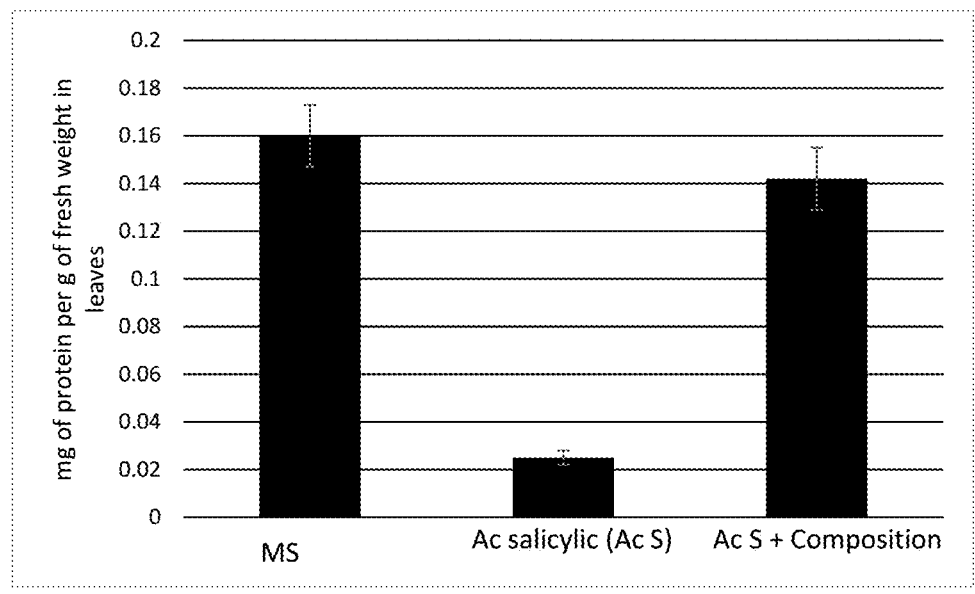
Figure 6:
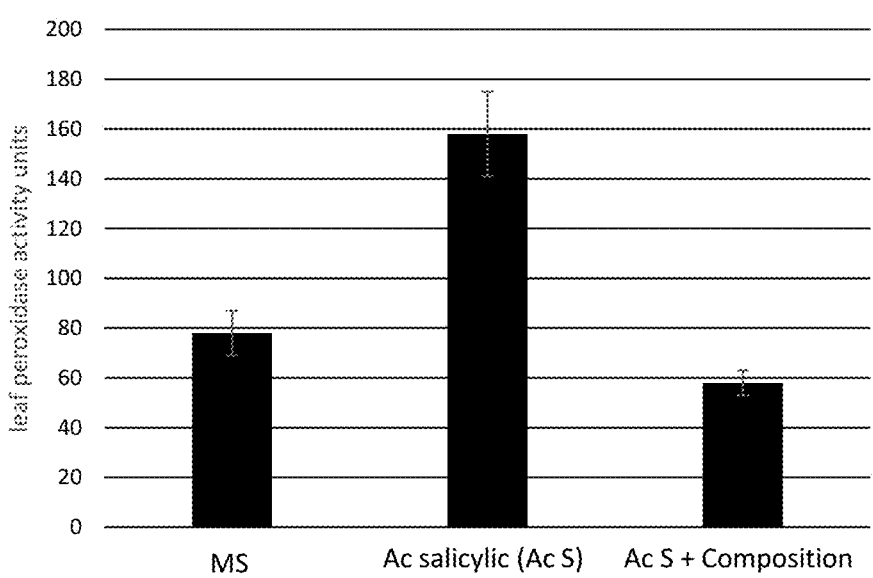

FIG. 6 shows graphs of the results regarding the number of leaves obtained by applying the composition of the present invention under conditions of physical damage.

Figure 7:
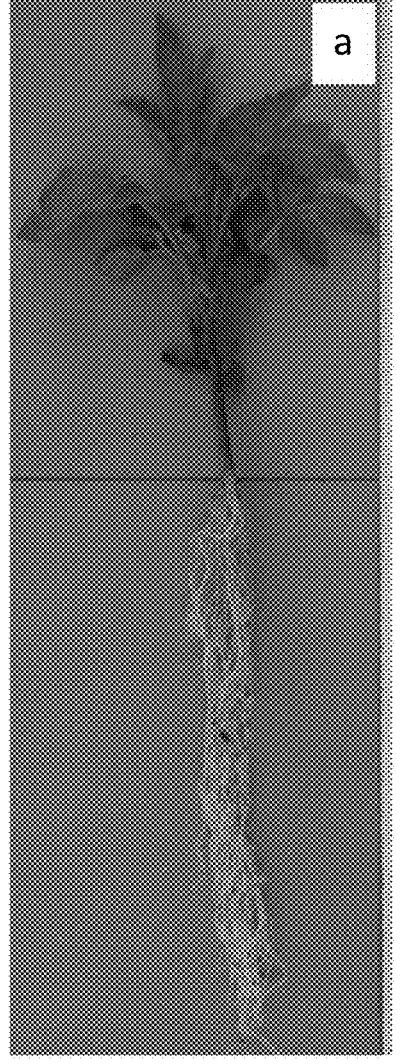
Figure 7:
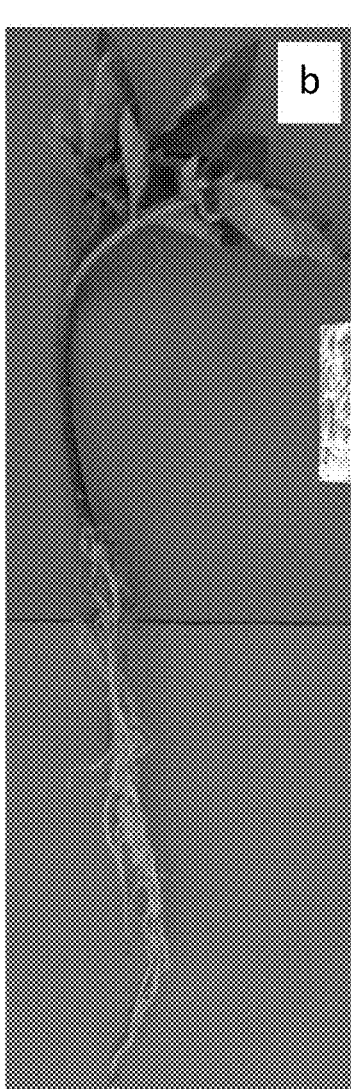

FIG. 7 shows comparative photographs of tomato plants subjected to salt stress with and without the composition of the present invention (a and b respectively).

Figure 8:
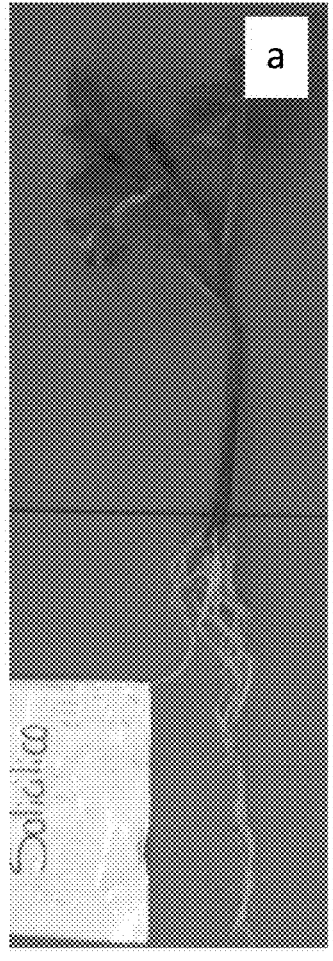
Figure 8:
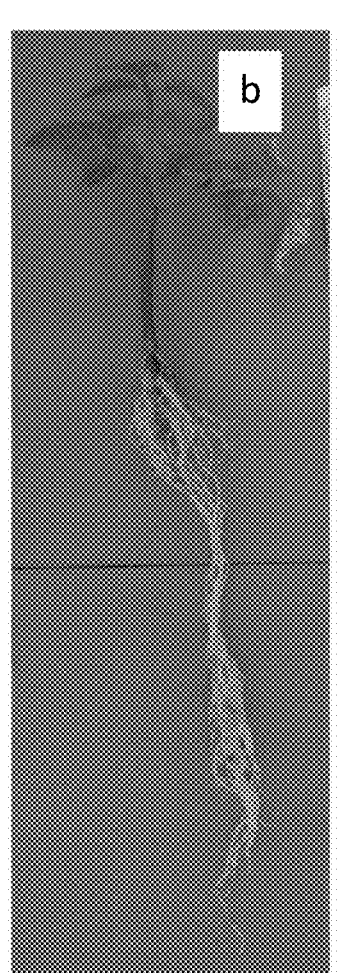

FIG. 8 shows comparative photographs of tomato plants subjected to physical stress, with and without the composition of the present invention (a and b, respectively).

Figure 9:

FIG. 9 shows comparative photographs of tomato plants subjected to water stress, with and without the composition of the present invention (a and b, respectively).

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention relates to a protective composition against damage caused in plants by biotic stress agents such as phytopathogenic agents selected from the group consisting of fungi, bacteria, viruses, and insect pests; and from abiotic stress agents such as salinity, drought, cold, and/or changes in soil pH. In addition, the composition of the present invention works as a plant growth stimulant, without causing morphological alterations in the plant tissues to which it is applied. Likewise, the composition of the present invention stimulates flowering, increases fruit filling, promotes the development of leaves, and increases stem thickness, thus increasing the yield of the crops in which it is applied, also improving the quality of the fruits produced causing an increase in their Brix degrees.

The protective composition against damage to plants, and repairing and stimulating the growth of their tissues of the present invention, comprises between 80% and 94% of an *Aloe vera* extract with a concentration of phenols between 10 and 20 mg/l and; between 6% and 20% of a vegetable dye, with an anthocyanin concentration of between 100 and 400 mg/L.

The composition of the present invention may additionally comprise between 5 to 7% free corn amino acids; and/or between 0.2 and 0.4% xanthan gum; and/or between 10 and 20% of a vegetable extract of purslane; and/or between 0.005 and 0.01% molasses.

The addition of free corn amino acids and/or xanthan gum enhances the composition's tissue growth-stimulating effect, while the addition of purslane extract provides the composition with a cryoprotective effect, and the addition of molasses enhances the protective effect against damage caused by drought.

The composition of the present invention is obtained by the following procedure:

a) pour *Aloe vera* gel into a heating tank and let it heat to a temperature between 45 and 55° C. for a period of time between 10 and 20 hours to increase the content of phenols and flavonoids in the gel;

b) filter the heated gel to remove insoluble remains and obtain an *Aloe vera* extract;

c) grind plant material rich in anthocyanins, such as purple corn, purple onion, carrot, pomegranate or blueberry, in a hammer mill and place the ground material in a stirring tank, with 70° ethanol in a ratio of 1/50 (kg/L), adjusting the pH of the solution between 3 and 4 with 50% HCl;

d) keep the solution from step d) under stirring and heating at a temperature between 95 and 100° C. for a period of time between 60 and 75 minutes, and then continue stirring for a period of time between 20 and 24 hours until reaching room temperature to obtain a cold extract;

e) filter the cold extract through gauze to retain remains of insoluble plant matter, to obtain a plant dye rich in anthocyanins;

f) dilute the *Aloe vera* extract from step b) to a concentration of between 10 and 20 mg/l of phenols;

g) mix the diluted *Aloe vera* extract from step f) with the dye from step e) in a stirring tank, in an amount of between 80 and 96% of *Aloe vera* extract, and between 6 and 20% of the vegetable dye, to obtain the protective composition against damage and plant growth stimulant of the present invention.

The method described above may further comprise a step of:

h) add to the composition of step g) between 5 and 7% of free corn amino acids; and/or between 0.2 and 0.4% xanthan gum; and/or between 10 and 20% of a vegetable extract of purslane; and/or between 0.005 and 0.01% molasses.

Preferably, the free corn amino acids used in the composition of the present invention are obtained from the following procedure:

i) grinding corn kernels in a disc mill 3 to 4 times to reduce the particle size;

ii) mix the ground corn with phosphate buffer at pH 4.6 in a 1/2 ratio (kg/L) in a stirring tank;

iii) heat the mixture from step ii) to a temperature between 60 and 65° C., and add between 8 and 9 g of papain and between 4 and 5 g of cellulase for each kg of ground corn;

iv) keep the mixture from step iii) stirred at 60° C. for a period of time between 100 and 120 hours to completely hydrolyze the corn proteins;

v) decanting the hydrolyzate to settle the corn residues and recover the supernatant;

vi) centrifuge the supernatant at 10,000 rpm with a basket centrifuge to obtain free maize amino acids.

The composition of the present invention is formulated in such a way that it can be applied directly on the aerial parts of the crops, on the root ball of the seedlings or directly on the soil, diluted at a proportion of 1-2 L in 100-300 L water, using conventional spray equipment. Furthermore, the composition of the present invention has been shown to have good stability and can be stored at a temperature between 25 and 45° C. for a period of up to 2 years, which is corroborated by effectiveness tests carried out at different storage times.

To evidence the protective and repairing capacities, as well as the stimulation of plant tissue growth of the composition of the present invention, the following tests were carried out:

1) Stimulation of Vegetative Shoots after Defoliation; and Stimulation of Flower Bud, Flower Set and Fruit Set in Blackberry Cultivation (*Rubus Ulmifolius*)

Tests of the composition of the present invention added with corn amino acids and xanthan gum were carried out in a blackberry crop (*Rubus ulmifolius*), in the community of Taretan, Michoacán. In these tests, the total surface of the crop was divided into two sections (A and B). The experimental unit consisted of 1 hectare in both sections. In section (A) vegetative development was stimulated and accelerated, and in section (B) flower bud, flower set, and fruit set were stimulated. For this, on Sep. 8, 2020, 1 L of the composition of the present invention added with free corn amino acids and xanthan gum was applied in 200 L of water by foliar route in section (A) of the plants, and in section (B) 1L of the composition of the present invention and 1 kg of Mix Zn—B in 200 L of water were applied by foliar route, leaving 5 furrows as a witness in the section (A) and 5 grooves in section (B). Two evaluations were carried out at 10-day intervals, starting on Sep. 8, 2020, and ending on Sep. 18, 2020. The results of the tests are shown in Table 1.

TABLE 2

| Measures before the composition was applied on Mar. 19, 2020. | | | | |
|---|---|---|---|---|
| Plants | # of groove | Stem thickness | Plant height | |
| A | 1 | 8.4 mm | 75 cm | TREATMENT |
| B | 3 | 7.0 mm | 87 cm | TREATMENT |
| C | 5 | 5.8 mm | 70 cm | TREATMENT |
| D | 7 | 6.3 mm | 85 cm | TREATMENT |
| E | 9 | 5.2 mm | 65 cm | TREATMENT |
| F | 11 | 7.7 mm | 82 cm | TREATMENT |
| G | 20 | 6.1 mm | 88 cm | TREATMENT |
| H | 23 | 5.5 mm | 67 cm | TREATMENT |
| I | 26 | 6.0 mm | 86 cm | CONTROL |
| J | 28 | 6.1 mm | 61 cm | CONTROL |

TABLE 3

| Measures after the application of the composition on Apr. 3, 2020. | | |
|---|---|---|
| | After application | |
| Plants | Stem thickness | Plant height |
| A | 9.4 mm | 102 cm |
| B | 8.3 mm | 110 cm |

TABLE 1

| Evolution of stem thickness, number of flower buds, flower number, number of fruits and measure of flower buds, at 0 and 10 days after treatment in section B. | | | | | | | | | | |
|---|---|---|---|---|---|---|---|---|---|---|
| PLANT | Stem thickness 8 Sep. 2020 | Stem thickness 18 Sep. 2020 | Flower buttons 8 Sep. 2020 | Flower button 18 Sep. 2020 | Flowers 8 Sep. 2020 | Flowers 18 Sep. 2020 | Fruits 8 Sep. 2020 | Fruits 18 Sep. 2020 | Button 8 Sep. 2020 | Button 18 Sep. 2020 |
| 1 | 4.1 mm | 5.6 mm | 10 | 3 | 1 | 6 | 0 | 1 | 6.5 mm | 9.0 mm |
| 2 | 3.7 mm | 4.9 mm | 1 | 17 | 1 | 2 | 0 | 1 | 6.7 mm | 9.8 mm |
| 3 | 3.9 mm | 5.9 mm | 2 | 4 | 2 | 2 | 0 | 2 | 5.8 mm | 9.1 mm |
| 4 | 6.1 mm | 6.8 mm | 1 | 12 | 4 | 3 | 5 | 8 | 5.7 mm | 8.1 mm |
| 5T | 5.0 mm | 5.2 mm | 4 | 2 | 2 | 2 | 0 | 0 | 6.4 mm | 8.5 mm |
| 6T | 4.1 mm | 4.7 mm | 7 | 6 | 0 | 1 | 0 | 0 | 4.0 mm | 6.2 mm |
| 7T | 3.8 mm | 4.4 mm | 13 | 15 | 0 | 1 | 0 | 0 | 5.3 mm | 7.9 mm |
| 8T | 4.4 mm | 5.0 mm | 4 | 4 | 0 | 0 | 0 | 0 | 5.4 mm | 7.5 mm |

2) Effectiveness of the Composition of the Present Invention to Increase Stem Thickness and Foliar Stimulation in Asparagus (*Asparagus officinalis*).

The test was carried out in San Luis de la Paz, Guanajuato, on an asparagus-producing ranch that belongs to Agrizar, from Mar. 19, 2020, to Apr. 3, 2020. First, the selection of the plants to be evaluated was made for both the control and the treatment. Subsequently, on Mar. 25, 2020, the application was carried out in a section of 1 Ha, using a dose of 2 L of the composition of the present invention with water consumption of 400 L per hectare. The application was carried out by foliar route using an M4025 tractor sprayer with 17 fan-type nozzles. On Apr. 1, 2020, the second application of the composition was carried out, at the same dose mentioned above. Finally, the selected plants were analyzed on Apr. 3, 2020. The results are shown in Tables 2 and 3.

TABLE 3-continued

| Measures after the application of the composition on Apr. 3, 2020. | | |
|---|---|---|
| | After application | |
| Plants | Stem thickness | Plant height |
| C | 9 mm | 112 cm |
| D | 8 mm | 96 cm |
| E | 6.8 mm | 74 cm |
| F | 9.7 mm | 134 cm |
| G | 8 mm | 89 cm |
| H | 8.1 mm | 98 cm |
| I | 7 mm | 95 cm |
| J | 7.2 mm | 87 cm |

Treatments with the composition of the present invention, showed an average growth (height) of 24.5 cm, while the control of 17.5 cm (7 cm less than the treated plants). The average thickness of the stem of the treated plants was 1.91 mm, while those that were not treated were 1.05 mm (0.86 mm less than those treated).

3) Effectiveness of the Composition of the Present Invention Added with Corn Amino Acids, as a Growth Inducer after Transplantation in Cultivation of Broccoli (*Brassica oleracea*).

The test was carried out in San Luis de La Paz, Guanajuato, on a ranch belonging to the El Sagrado Agricultural Company, from Apr. 21, 2020 to Apr. 30, 2020. The experimental unit consisted of 2 Ha. The first Application was to the soil on Apr. 21, 2020, and was carried out in a 2 Ha section at a dose of 1 L of the composition added with free corn amino acids per hectare, with water consumption of 500 L. The second application was carried out on Apr. 30, 2020, 9 days after the first application, with a water consumption per hectare of 600 L. Two plants with treatment and two control plants without treatment were selected at random, trying to ensure that they were under the same conditions at the beginning. The test results are shown in Tables 4 to 7.

TABLE 4

| Test start Apr. 21, 2020 | | |
| --- | --- | --- |
| PLANT | Stem thickness | Plant height |
| TREATMENT A | 2.6 mm | 5 cm |
| TREATMENT B | 3 mm | 5 cm |
| CONTROL A | 2 mm | 5 cm |
| CONTROL B | 2.5 mm | 5 cm |

TABLE 5

| First measurement Apr. 27, 2020 | | |
| --- | --- | --- |
| PLANT | Stem thickness | Plant height |
| TREATMENT A | 3.7 mm | 11 cm |
| TREATMENT B | 4.7 mm | 11 cm |
| CONTROL A | 3.2 mm | 9 cm |
| CONTROL B | 2.7 mm | 7 cm |

TABLE 6

| Second measurement Apr. 30, 2020 | | |
| --- | --- | --- |
| PLANT | Stem thickness | Plant height |
| TREATMENT A | 4.8 mm | 15 cm |
| TREATMENT B | 5.2 mm | 15 cm |
| CONTROL A | 3.8 mm | 10 cm |
| CONTROL B | 2.9 mm | 10 cm |

TABLE 7

| Third measurement May 5, 2020 | | |
| --- | --- | --- |
| PLANT | Stem thickness | Plant height |
| TREATMENT A | 6.5 mm | 18 cm |
| TREATMENT B | 7.9 mm | 20 cm |
| CONTROL A | 6 mm | 12 cm |
| CONTROL B | 4.8 mm | 13 cm |

As can be seen, with the treatment the plants have a stem thickness and a height greater than that of the controls. Additionally, the length and width of the leaves were compared, making a comparative assessment on May 5, 2020. It was found that the control leaves had a length of 9 cm and a width of 7 cm, while averages were obtained with the treatment. long and wide 11 cm and 12 cm respectively. The foregoing demonstrates that with the application of the composition of the present invention it is possible to induce the growth of broccoli seedlings after transplantation.

4) Effectiveness of the Composition Added with Free Corn Amino Acids and Xanthan Gum, for Cell Regeneration in Broccoli Poisoned by Insecticide Application, in Dolores Hidalgo, Guanajuato.

The test was carried out from Mar. 28, 2020 to Apr. 7, 2020, in Dolores Hidalgo, Guanajuato, on a ranch that belongs to Mar Bran Co. for the production of broccoli. The experimental unit consisted of 3 Ha. An application of the composition added with free corn amino acids and xanthan gum was made at a dose of 1 L per 600 L of water per hectare. The level of crop recovery after intoxication by a high-dose application of an insecticide was evaluated.

Figure 1:
FIG. 1 shows photographs of a broccoli crop with leaf burn, membrane damage, and tissue death caused by insecticide application.
Figure 1:
Figure 2:
FIG. 2 shows photographs of a broccoli crop, to which the composition of the present invention was applied after damage by insecticide application, observing rapid cell regeneration, increased plant strength, and improvement in the color of leaves.
Figure 2:

At the beginning of the test, the damage caused by a high dose of insecticide was 100% of the total number of plants, presenting burns on the leaves, causing death of the tissue (FIG. 1). The 3 hectares were recovered with the application of the composition, taking the crop to harvest, avoiding losses and losses due to the damage caused. Rapid cell regeneration, increased plant vigor, significant vegetative development, and improvement in leaf color were observed (FIG. 2). The composition of the present invention, added with free corn amino acids and xanthan gum, acted by eliminating free radicals caused by the damage caused to the crop, it also generated a cell film that protected the plants from external agents, through a process of oxidation-reduction.

5) Effectiveness of the Composition to Accelerate Vegetative Development in Pickle Cucumber (*Cucumis sativus*) var. *tasty*.

The test was carried out in Acambaro, Guanajuato, in one hectare. The application of the composition was carried out via foliar on Apr. 6, 2020, at a dose of 1 L per 200 L of water per hectare. The application ended on Apr. 13, 2020. 1 Ha of control and 1 Ha of treatment were taken to have a point of comparison. As can be seen in FIG. 3, at the beginning of the test on April 6, non-uniform growth and very little leaf growth are observed in the control and treatment (a); on April 13, better growth is observed in the treatment with a greater number of leaves (b); and on April 16, more uniform growth and greater foliar growth is observed in the treatment, compared to the control (c). Therefore, with the application of the composition of the present invention, remarkable results were obtained, since the crop developed uniformly and there was a higher production than with respect to the control.

6) Embryogenesis in Tobacco Plants.

To evaluate the effectiveness of the composition of the present invention in the generation of somatic embryos in tobacco plants, explants (plant tissues grown in vitro) were inoculated with their apical part in contact with the surface of Murashige and Skoog (MS) medium. The medium (MS) contained 0.2 mg/L indoleacetic acid and 2.5 mg/L benzyl adenine for direct somatic embryogenesis induction. In order to assess the extent of the activity of the composition in embryogenesis, tests were performed in which only 10% of the inducers were added to the culture medium and compared to the Murashige and Skoog medium at 10% of inductors plus 1% of the composition of the present invention. Embryo development was better in the medium added with 1% of the composition of the present invention compared to that in which the medium contained only 10% of the inductors. Therefore, it can be concluded that the composition has cell regeneration capacity in explants of tobacco (*Nicotiana tabacum*).

7) Tomato Plants Grown in MS Medium and Supplemented with the Composition Added with Molasses in Stress Situations.

Tomato plants were placed in closed containers with Murashige and Skoog (MS) medium, and the following treatments were added to simulate stress conditions:

Salinity, adding potassium chloride to the medium (MS).

Drought, adding a desiccant (polyethylene glycol) to the MS medium.

Physical damage, adding salicylic acid to the MS medium.

As a way to measure stress, catalase and peroxidase activity were measured in leaves and roots. These enzymes increase when there are free radicals. As can be seen in the graphs in FIG. 4, under salinity conditions, the composition added with molasses allows the weight of leaves to be increased and the stress to be reduced with respect to the control. The same occurs under conditions of drought and physical damage (FIGS. 5 and 6). The foregoing demonstrates that with the use of the composition of the present invention added with molasses, it is possible to limit the damage caused by environmental stress in tomato plants.

8) Tests with Tomato Plants Under Greenhouse Conditions.

Tomato plants were planted in pots in which the substrate was salinized with potassium chloride, the induction of physical damage was carried out with salicylic acid and water stress was induced by not watering the plants for two weeks. The plants were divided into two groups, one of which was added with the composition of the present invention added with molasses, diluted to 1%.

The tests carried out showed that, with the addition of the composition of the present invention added with molasses, greater growth of the plants is observed, with more abundant roots, firmer stems, and a greater number of leaves (FIGS. 7, 8, and 9).

9) Application of the Composition Added with Purslane Extract in Bean Root Ball.

The composition of the present invention, added with purslane extract, was applied to the bean root ball at a concentration of 1% for 30 seconds, in bean seedlings that presented damage by mosquitoes and cold. As can be seen in Table 8, there is an increase in the total number of pods, their fresh weight, and the total number of leaves of the treated plants with respect to the control, which is indicative of the protective and regenerative effect on tissue damaged by biological and physical agents.

TABLE 8

Effect of the application of the composition added with purslane extract in bean root ball.

| Treatment | Pods number | Pods fresh weight (g) | Healthy leaves |
|---|---|---|---|
| Control | 20 | 41.15 | 2 |
| Composition with purslane extract | 22 | 55.21 | 14 |

10) Application in Cucumber Root Ball.

The composition of the present invention added with molasses was applied to the root ball of cucumber seedlings at a concentration of 1% for a time of 30 seconds and they were sown in a greenhouse under controlled lighting and irrigation conditions. Plants without treatment were planted as controls. The plants were subjected to conditions without irrigation to generate drought stress. As can be seen in Table 9, the plants treated with the composition of the present invention added with molasses have a greater mass both in fresh weight and in dry weight with respect to the control without treatment, which is indicative of better growth under stress conditions.

TABLE 9

Plant weight under water stress conditions.

| | Fresh weight (g) | | Dry weight (g) | |
|---|---|---|---|---|
| | Root | Plant | Root | Plant |
| Control | 18.82 | 84.21 | 2.14 | 14.57 |
| Composition added with molasses | 28.56 | 110.02 | 3.58 | 16.17 |

Additionally, the number of fruits produced was counted, separating them by the size obtained, as shown in Table 10.

TABLE 10

Number of total fruits

| Treatment | Total big cucumbres | Total small cucumbers | TOTAL |
|---|---|---|---|
| Control | 16 | 9 | 25 |
| Composition added with molasses | 14 | 17 | 31 |

As seen in Table 10, there is a greater production of fruits in the treated plants, which indicates a better development of the plants and a better storage of energy reserves.

As can be evidenced from the tests shown above, the present invention allows to effectively control the damage caused by biotic and abiotic stress agents. In addition, it promotes the growth of crops, improving the vigor of the plants in which it is used.

The present invention has been described according to a preferred embodiment; however, it will be apparent to a person skilled in the art that modifications may be made to the invention without departing from its spirit and scope.

What is claimed is:

1. An agricultural composition comprising an *Aloe vera* extract having a specific concentration of phenols, and an anthocyanin-rich plant dye having a specific concentration of anthocyanins, wherein the *Aloe vera* extract is present in an amount of 80% w/w-94% w/w, and the anthocyanin-rich plant dye is present in an amount of 6-20% w/w, wherein the specific concentration of phenols in the *Aloe vera* extract together the specific concentration of anthocyanins in the anthocyanin-rich plant dye promote the regeneration of plant tissue damaged by biotic and/or abiotic stress agents, the specific concentration of phenols in the *Aloe vera* extract being 10 mg/L to 20 mg/L, and the specific concentration of anthocyanins in the anthocyanin-rich plant dye being 100 mg/L to 400 mg/L, wherein the *Aloe vera* extract is an extract of *Aloe vera* gel heated at a temperature of 45-55° C. for a time of 10-20 hours, and the anthocyanin-rich plant dye is a purple corn dye or a purple onion dye.

2. The agricultural composition according to claim 1, wherein the agricultural composition further comprises between 10% and 7% of free corn amino acids; and/or between 0.2% and 0.4% xanthan gum; and/or between 10% and 20% of a vegetable extract of purslane, and/or between 0.005% and 0.01% by weight of molasses.

3. The agricultural composition according to claim 1, wherein the agricultural composition is adapted to be sprayed on aerial parts, root ball, or soil of crops, diluted at a ratio of between 1-2 L of the agricultural composition in 100-300 liters of water.

4. The agricultural composition according to claim 2, wherein the agricultural composition is adapted to be sprayed on aerial parts, root ball, or soil of crops, diluted at a ratio of between 1-2 L of the agricultural composition in 100-300 liters of water.

5. The agricultural composition according to claim 1, wherein the agricultural composition is stable for up to 2 years at a temperature between 25 and 45° C.

6. The agricultural composition according to claim 2, wherein the agricultural composition is stable for up to 2 years at a temperature between 25 and 45° C.

7. The agricultural composition as in any of claims 1-4, wherein the biotic stress agents are selected from the group consisting of fungi, bacteria, viruses, and pest insects; and the abiotic stress agents are selected from the group consisting in salinity, drought, cold and/or changes in pH.

8. A method for obtaining the agricultural composition against damage to plants, and repairing and stimulating the growth of their tissues of claim 1, characterized in that it comprises the steps of:

a) pour *Aloe vera* gel into a heating tank and let it heat to a temperature between 45 and 55° C. for a period of time between 10 and 20 hours to increase the content of phenols and flavonoids in the *Aloe vera* gel;

b) filter the heated gel to remove insoluble challenges and obtain an *Aloe vera* extract;

c) grind plant matter rich in anthocyanins in a hammer mill and place the ground material in a stirring tank with 70° ethanol in a ratio of 1/50 (kg/L), adjusting the pH of the solution between 3 and 4 with 50% HCl;

d) keep the solution from step c) under stirring and heating at a temperature between 95 and 100° C. for a period of time of 60 to 75 minutes, and then continue stirring for a period of time of 20 to 24 hours until reach room temperature to obtain a cold extract;

e) filter the cold extract through gauze to retain the remains of plant material, to obtain a plant dye rich in anthocyanins;

f) dilute the *Aloe vera* extract from step b) to a concentration of between 10 and 20 mg/l of phenols; and g) mix the diluted *Aloe vera* extract from step f) with the dye from step e) in a stirring tank in an amount of between 80 and 96% of *Aloe vera* extract, and between 6 and 20% of the vegetable dye to obtain the composition of claim 1.

9. The method according to claim 8, characterized in that the anthocyanin-rich plant dye rich in anthocyanins is selected from the group consisting of purple corn or purple onion.

10. The method according to claim 8, wherein the process further comprises the step of: h) adding to the composition of step g) between 5 and 7% of free corn amino acids; and/or between 0.2 and 0.4% xanthan gum; and/or between 10 and 20% of a vegetable extract of purslane; and/or between 0.005 and 0.01% molasses.

11. The method according to claim 9, wherein the process further comprises the step of: h) adding to the composition of step g) between 5 and 7% of free corn amino acids; and/or between 0.2 and 0.4% xanthan gum; and/or between 10 and 20% of a vegetable extract of purslane; and/or between 0.005 and 0.01% molasses.

12. The method according to claim 10, wherein the free corn amino acids are obtained by a process comprising the steps:

i) grinding corn kernels in a disc mill 3 to 4 times to reduce the particle size;

ii) mixing the ground corn with phosphate buffer at pH 4.6 in a 1/2 ratio (kg/L) in an agitation tank;

iii) heating the mixture from step ii) to a temperature between 6° and 65° C., and adding between 8 and 9 g of papain and between 4 and 5 g of cellulase for each kg of ground corn;

iv) keeping the mixture from step iii) stirred at 60° C. for a period of time of 100 to 120 hours to completely hydrolyze the corn proteins;

v) decanting the hydrolyzate to settle the corn residues and recover the supernatant and;

vi) centrifuging the supernatant at 10,000 rpm with a basket centrifuge to obtain free maize amino acids.

13. A method of applying the agrochemical composition of any of the claims 1-6 for the regeneration of plant tissue of plants damaged by biotic and/or abiotic stress agents, wherein the biotic stress agents are selected from the group consisting of fungi, bacteria, viruses, and pest insects; and the abiotic stress agents are selected from the group consisting in salinity, drought, cold and/or changes in pH.

14. A method of applying the agrochemical composition of claim 13, wherein the agricultural composition is sprayed on aerial parts, root ball, or soil of crops, said agricultural composition being diluted at a ratio of between 1-2 L of the agricultural composition in 100-300 liters of water.

\* \* \* \* \*